United States Patent
Moon et al.

(10) Patent No.: US 12,316,443 B2
(45) Date of Patent: *May 27, 2025

(54) APPARATUS AND METHOD FOR TRANSMITTING SYNCHRONIZATION INFORMATION IN COMMUNICATION SYSTEM

(71) Applicant: Samsung Electronics Co., Ltd., Suwon-si (KR)

(72) Inventors: Sangjun Moon, Suwon-si (KR); Yoonseon Han, Suwon-si (KR); Sangsoo Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/599,046

(22) Filed: Mar. 7, 2024

(65) Prior Publication Data

US 2024/0214098 A1 Jun. 27, 2024

Related U.S. Application Data

(63) Continuation of application No. 17/303,166, filed on May 21, 2021, now Pat. No. 11,929,827.

(30) Foreign Application Priority Data

May 21, 2020 (KR) .................. 10-2020-0061218

(51) Int. Cl.
*H04W 8/24* (2009.01)
*H04J 3/06* (2006.01)
*H04W 56/00* (2009.01)

(52) U.S. Cl.
CPC .......... *H04J 3/0667* (2013.01); *H04J 3/0644* (2013.01); *H04W 8/24* (2013.01); *H04W 56/001* (2013.01)

(58) Field of Classification Search
CPC .......... H04J 3/0667; H04J 3/0644; H04J 3/12; H04J 3/0673; H04J 3/0682; H04W 8/24; H04W 56/001

See application file for complete search history.

(56) References Cited

U.S. PATENT DOCUMENTS 10,084,559 B1 * 9/2018 Devineni ............... H04J 3/0661
11,405,122 B2 * 8/2022 Wang .................... H04J 3/0667
(Continued)

FOREIGN PATENT DOCUMENTS

EP  4147387 A1  3/2023
EP  4186287 A1  5/2023
(Continued)

OTHER PUBLICATIONS

Diachina et al. U.S. Appl. No. 62/992,421, filed Mar. 20, 2020 (Year: 2020).*

(Continued)

*Primary Examiner* — Wutchung Chu

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Disclosed are an apparatus and a method for providing time synchronization between wiredly or wirelessly connected terminals by expanding a function for supporting a Time Sensitive Network (TSN) in a 5G System (5GS) of $3^{rd}$ Generation Partnership Project (3GPP).

14 Claims, 16 Drawing Sheets

(56) References Cited

U.S. PATENT DOCUMENTS

| | | | |
|---|---|---|---|
| 2016/0173267 A1* | 6/2016 | Zhang | H04L 7/0008 709/248 |
| 2018/0199328 A1* | 7/2018 | Sang | H04L 5/001 |
| 2019/0239281 A1* | 8/2019 | Wu | H04W 8/08 |
| 2019/0289616 A1 | 9/2019 | Hampel et al. | |
| 2019/0327680 A1* | 10/2019 | Xu | H04W 76/11 |
| 2020/0021379 A1* | 1/2020 | Aweya | H04J 3/0673 |
| 2020/0228220 A1* | 7/2020 | Joseph | H04J 3/0673 |
| 2020/0267673 A1* | 8/2020 | Joseph | H04J 3/0641 |
| 2021/0119717 A1* | 4/2021 | Li | H04W 56/001 |
| 2021/0273736 A1* | 9/2021 | Li | H04W 76/12 |
| 2021/0288736 A1* | 9/2021 | Guignard | H04J 3/0667 |
| 2021/0314807 A1* | 10/2021 | Li | H04W 28/12 |
| 2021/0329584 A1* | 10/2021 | Prakash | H04W 72/1268 |
| 2021/0359778 A1* | 11/2021 | Wang | H04L 69/28 |
| 2021/0360548 A1* | 11/2021 | Chandramouli | H04W 56/0015 |
| 2021/0377807 A1* | 12/2021 | Lee | H04W 28/0236 |
| 2022/0030530 A1* | 1/2022 | Munz | H04J 3/0667 |
| 2022/0174625 A1* | 6/2022 | Xiong | H04W 48/18 |
| 2022/0210755 A1* | 6/2022 | Xiong | H04W 40/02 |
| 2022/0216932 A1* | 7/2022 | Wang | H04W 56/0015 |
| 2022/0239398 A1* | 7/2022 | Li | H04W 56/0015 |
| 2022/0330183 A1* | 10/2022 | Minokuchi | H04J 3/0667 |
| 2022/0338142 A1* | 10/2022 | Minokuchi | H04W 56/0015 |
| 2022/0353834 A1* | 11/2022 | Qiang | H04L 12/4633 |
| 2022/0361129 A1* | 11/2022 | Fan | H04W 56/0045 |
| 2022/0369263 A1* | 11/2022 | Singh | H04W 56/002 |
| 2023/0040220 A1* | 2/2023 | Qiang | H04W 52/028 |
| 2023/0104424 A1* | 4/2023 | Diachina | H04J 3/0667 370/350 |
| 2023/0121856 A1* | 4/2023 | Cao | H04W 56/0065 370/329 |
| 2023/0134036 A1* | 5/2023 | Larsson | H04W 56/004 370/350 |
| 2024/0283555 A1* | 8/2024 | Xia | H04W 56/0015 |

FOREIGN PATENT DOCUMENTS

| | | |
|---|---|---|
| WO | 2019125863 A1 | 6/2019 |
| WO | 2020021309 A1 | 1/2020 |
| WO | 2021226394 A1 | 11/2021 |
| WO | 2022067732 A1 | 4/2022 |

OTHER PUBLICATIONS

International Search Report of the International Searching Authority dated Aug. 27, 2021, in connection with International Application No. PCT/KR2021/006326, 3 pages.

3GPP TS 23.501 V16.4.0 (Mar. 2020), Technical Specification, 3rd Generation Partnership Project; Technical Specification Group Services and System Aspects; System architecture for the 5G System (5GS); Stage 2 (Release 16), Mar. 2020, 430 pages.

3GPP TR 23.734 V16.2.0 (Jun. 2019), Technical Report, 3rd Generation Partnership Project; Technical Specification Group Services and System Aspects; Study on enhancement of 5G System (5GS) for vertical and Local Area Network (LAN) services (Release 16), Jun. 2019, 117 pages.

Nokia, et al., "Synchronization," S2-188103, SA WG2 Meeting #128-Bis, Sophia Antipolis, Aug. 20-24, 2018, 5 pages.

Supplementary European Search Report dated Oct. 2, 2023, in connection with European Patent Application No. 21808666.8, 10 pages.

3GPP TS 24.519 V2.2.0 (Mar. 2020) Technical Specification 3rd Generation Partnership Project; Technical Specification Group Core Network and Terminals; 5G System (5GS); Time-Sensitive Networking (TSN) Application Function (AF) to Device-Side TSN Translator (DS-TT) and Network-Side TSN Translator (NW-TT) protocol aspects; Stage 3 (Release 16); 43 pages.

3GPP TR 23.700-20 V0.3.0 (Jan. 2020) Technical Report; 3rd Generation Partnership Project; Technical Specification Group Services and System Aspects; Study on enhanced support of Industrial Internet of Things (IIoT) in 5G System (Release 17); 33 pages.

Notice of Reasons for Refusal dated Apr. 15, 2025, in connection with Japanese Application No. 2022-571343, 10 pages.

* cited by examiner

DS-TT Generates (g)PTP Messages (including UE-to-UE case) (Configuration by TSN AF or NEF/AF)

APPARATUS AND METHOD FOR TRANSMITTING SYNCHRONIZATION INFORMATION IN COMMUNICATION SYSTEM

CROSS-REFERENCE TO RELATED APPLICATION

This application is a continuation of application Ser. No. 17/303,166, filed May 21, 2021, now U.S. Pat. No. 11,929,827, which is based on and claims priority under 35 U.S.C. 119 to Korean Patent Application No. 10-2020-0061218, filed on May 21, 2020, in the Korean Intellectual Property Office, the disclosures of which are herein incorporated by reference in their entirety.

BACKGROUND

1. Field

The disclosure relates to a communication system and, more particularly to, an apparatus and a method for providing time synchronization between terminal wiredly or wirelessly connected to each other through expansion of a function supporting a Time Sensitive Network (TSN) in a $3^{rd}$ Generation Partnership Project (3GPP) 5G System (5GS).

2. Description of Related Art

To meet the demand for wireless data traffic having increased since deployment of 4 G communication systems, efforts have been made to develop an improved 5G or pre-5G communication system. Therefore, the 5G or pre-5G communication system is also called a 'Beyond 4 G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FOAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

When a Network-side TSN Translator (NW-TT) or a Device-side TSN Translator (DS-TT) generates a generic Precision Time Protocol ((g)PTP) message and transfers the (g)PTP message to an external wired and wireless nodes on the basis of a 3GPP network (or 5GS) corresponding to a synchronization source, it should be determined whether to transmit the (g)PTP message within the 3GPP network or the 5GS.

In accordance with an aspect of the disclosure, a method performed by a terminal including a device side time sensitive network (TSN) translator (DS-TT) in a wireless communication system is provided. The method includes receiving, from a first network function entity via a base station, time synchronization information associated with a 5th generation system (5GS) capability to support time synchronization of a time sensitive network (TSN) system, wherein the time synchronization information includes first information indicating a capability of the DS-TT being a grandmaster for the time synchronization and second information on a transport type for a distribution of the time synchronization; generating a first sync message based on the time synchronization information; and transmitting, to an external precision time protocol (PTP) port of the TSN system, the first sync message for the time synchronization based on the transport type.

In the method, the transport type is associated with one of a generic PTP (gPTP) or a PTP.

In the method, the first network function entity includes at least one of a TSN application function (TSN AF) entity or a network exposure function (NEF) entity.

Further, the method includes transmitting, to a second network function entity including a network-side TSN translator (NW-TT) in a 5GS, a second sync message for the time synchronization based on the first sync message, wherein the second sync message includes an ingress timestamp corresponding to a time when the first sync message is generated and a rate ratio with a value set to 1.

In the method, a third sync message is transmitted to an external PTP port of the TSN system based on the second sync message, and the third sync message includes an egress timestamp corresponding to a time when the third sync message is transmitted and a residence time calculated as a difference between the egress time and the ingress time.

In accordance with another aspect of the disclosure, a method performed by a second network function entity including a network side time sensitive network (TSN) translator (NW-TT) in a communication system is provided. The method includes receiving, from a first network function entity, time synchronization information associated with a 5th generation system (5GS) capability to support time synchronization of a time sensitive network (TSN) system, wherein the time synchronization information includes first information associated with a capability of the NW-TT being a grandmaster for the time synchronization and second information on a transport type for a distribution of the time synchronization; generating a first sync message based on the time synchronization information; and transmitting, to an external precision time protocol (PTP) port of the TSN system, the first sync message for the time synchronization based on the transport type.

In the method, the transport type is associated with one of a generic PTP (gPTP) or a PTP.

In the method, the first network function entity includes at least one of a TSN application function (TSN AF) entity or a network exposure function (NEF) entity.

Further, the method includes transmitting, to a terminal including a device-side TSN translator (DS-TT), a second sync message for the time synchronization based on the first sync message, wherein the second sync message includes an ingress timestamp corresponding to a time when the first sync message is generated and a rate ratio with a value set to 1.

In the method, a third sync message is transmitted to an external PTP port of the TSN system based on the second sync message, and the third sync message includes an egress timestamp corresponding to a time when the third sync message is transmitted and a residence time calculated as a difference between the egress time and the ingress time.

In accordance with another aspect of the disclosure, a terminal including a device side time sensitive network (TSN) translator (DS-TT) in a wireless communication system is provided. The terminal includes a transceiver configured to transmit and receive a signal; and a controller coupled with the transceiver and configured to: receive, from a first network function entity via a base station, time synchronization information associated with a 5th generation system (5GS) capability to support time synchronization of a time sensitive network (TSN) system, wherein the time synchronization information includes first information indicating a capability of the DS-TT being a grandmaster for the time synchronization and second information on a transport type for a distribution of the time synchronization, generate a first sync message based on the time synchronization information, and transmit, to an external precision time protocol (PTP) port of the TSN system, the first sync message for the time synchronization based on the transport type.

In accordance with another aspect of the disclosure, a second network function entity including a network side time sensitive network (TSN) translator (NW-TT) in a communication system is provided. The second network function entity includes a transceiver configured to transmit and receive a signal; and a controller coupled with the transceiver and configured to: receive, from a first network function entity, time synchronization information associated with a 5th generation system (5GS) capability to support time synchronization of a time sensitive network (TSN) system, wherein the time synchronization information includes first information associated with a capability of the NW-TT being a grandmaster for the time synchronization and second information on a transport type for a distribution of the time synchronization, generate a first sync message based on the time synchronization information, and transmit, to an external precision time protocol (PTP) port of the TSN system, the first sync message for the time synchronization based on the transport type.

The disclosure can reduce load of a terminal/network and power consumption of the terminal by reducing the generation of unnecessary (g)PTP message traffic within the 5GS.

Further, the disclosure can provide 5GS synchronization (sync) to an application which does not support TSN such as a Video Image Audio Professional Application (VIAPA).

Particularly, ports of a DS-TT and an NW-TT may provide clock synchronization (sync) in different domains and thus provide sync having sync precision in individual sync message types, so as to support an environment that demands various clock syncs.

For example, sync of 1 μs for factory automation may be provided between wired networks and sync of 100 μs for audio service may be provided between wireless terminals in the 5GS.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the disclosure and its advantages, reference is now made to the following description taken in conjunction with the accompanying drawings, in which like reference numerals represent like parts.

DETAILED DESCRIPTION

Figure 1:
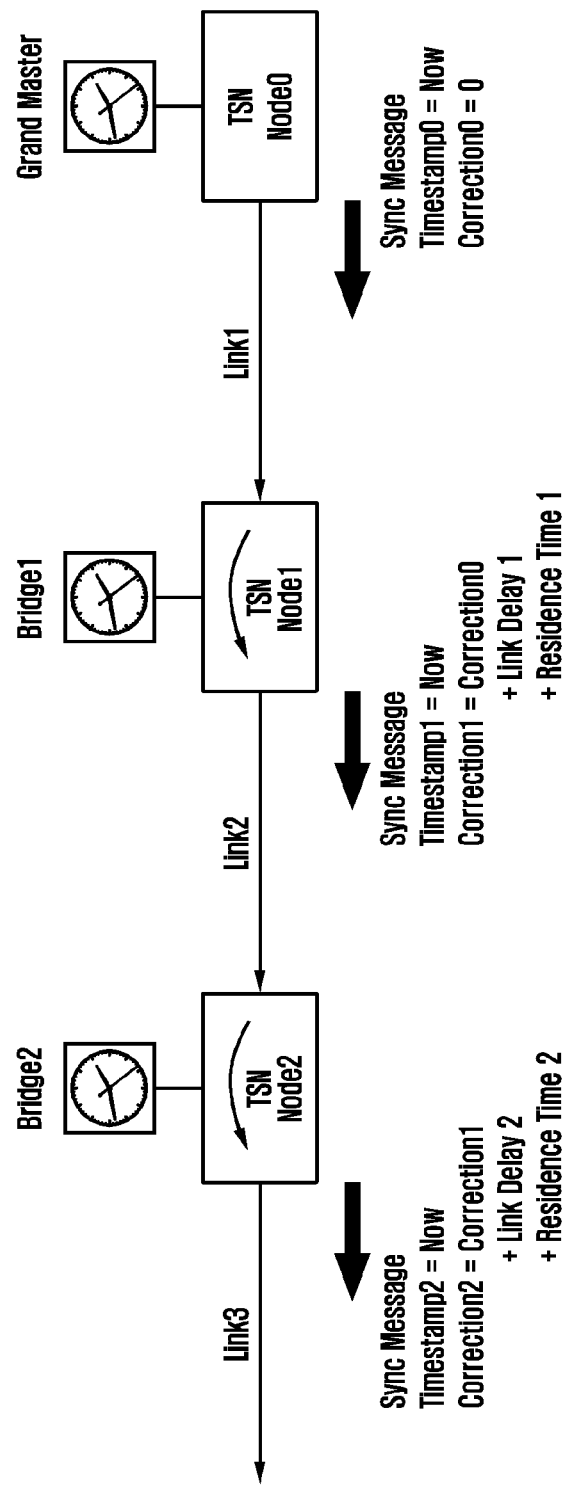
FIG. 1 illustrates a conceptual diagram of the principle of time synchronization in Ethernet of TSN.

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, the operation principle of the disclosure will be described in detail with reference to the accompanying drawings. In the following description of the disclosure, a detailed description of known functions or configurations incorporated herein will be omitted when it may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure will be described using terms and names defined in the 5GS and NR standards which are the latest standards specified by the 3rd generation partnership project (3GPP) group among existing communication standards, for the convenience of description. However, the disclosure is not limited by these terms and names, and may be applied in the same way to systems that conform with other standards.

For convenience of the following description, targets that exchange information for access control and state management are collectively called NFs in the disclosure. The NF may include an Access and Mobility Management Function (hereinafter, referred to as AMF) device, a Session Management Function (hereinafter, referred to as SMF) device, a Policy and Charging Function (hereinafter, referred to as PCF) device, a TSN application function device, or a device similarly functioning in a core network. Further, the embodiments may be equally applied to the case in which the NF is actually implemented as instance (AMF Instance, SMF Instance, NSSF Instance, or the like).

In the disclosure, an instance may mean a state in which a specific NF exists in the form of a software code and physical or/and logical resources may be allocated from a computing system to perform an NF function and executed by a physical computing system, for example, a specific computing system existing in a core network. Accordingly, all NF instances such as an AMF instance, an SMF instance, and the like may mean that physical or/and logical resources may be used for the NF operation after being allocated from a specific computing system existing in a core network. As a result, the same operation may be performed when NF devices such as physical AMF, SMF, and the like exist and in the case of the NF instance receiving physical or/and logical resources for the NF operation from the specific computing system to use the same.

In order to support a scenario such as factory automation, time synchronization of relevant nodes is needed. Particularly, in a situation in which precision work is required, high precision of time synchronization is needed. When industrial Ethernet is used, a Time Sensitive Networking (TSN) technology corresponding to a method supporting time synchronization between nodes connected through Ethernet has been researched, commercialized, and used.

FIG. 1 illustrates a conceptual diagram of the principle of time synchronization in Ethernet of TSN.

Referring to FIG. 1, nodes of TSN may determine a Grand Master (GM) which is the standard. For example, TSN node 0 may input the current time of the GM into a timestamp field and 0 into a correction field, generate a synchronization (sync) frame, and then transmit the sync frame to the next node. TSN node 1 which is the next node may receive a sync frame in which link delay 1 is reflected, update the correction field in consideration of residence time 1 that is a time spent in its own node, and then transmit the sync frame to the next node. TSN node 2 which is the next node may receive a sync frame in which link delay 2 is reflected, update the correction field in consideration of residence time 2 that is a time spent in its own node, and then transmit the sync frame to the next node. Each node may periodically measure a delay time of a link with the previous node and calculate an average. Further, each node may calculate a time spent within its own node.

Figure 2:
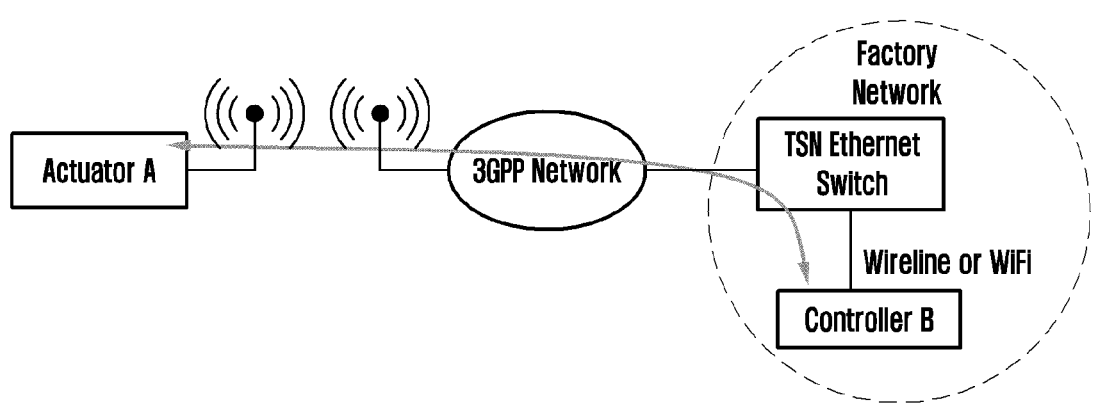
FIG. 2 illustrates a conceptual diagram of a scenario in which TSN time synchronization is supported in a 5G network according to an embodiment.

FIG. 2 illustrates a conceptual diagram of a scenario in which TSN time synchronization is supported in a 5G network according to an embodiment.

Referring to FIG. 2, a 5G network may support TSN in a factory automation scenario in which mobility is supported through the application of the 5G network. Referring to FIG. 2, a controller B of a factory network connected to an external TSN node may give a command to an actuator A of a factory through a 3GPP network. At this time, the 3GPP network, that is, a 5GS may act as a bridge of TSN and provide time synchronization to the actuator. Accordingly, the 3GPP network of FIG. 2 may correspond to TSN node 1 of FIG. 1, and the actuator A may correspond to TSN node 2 of FIG. 1.

Figure 3:
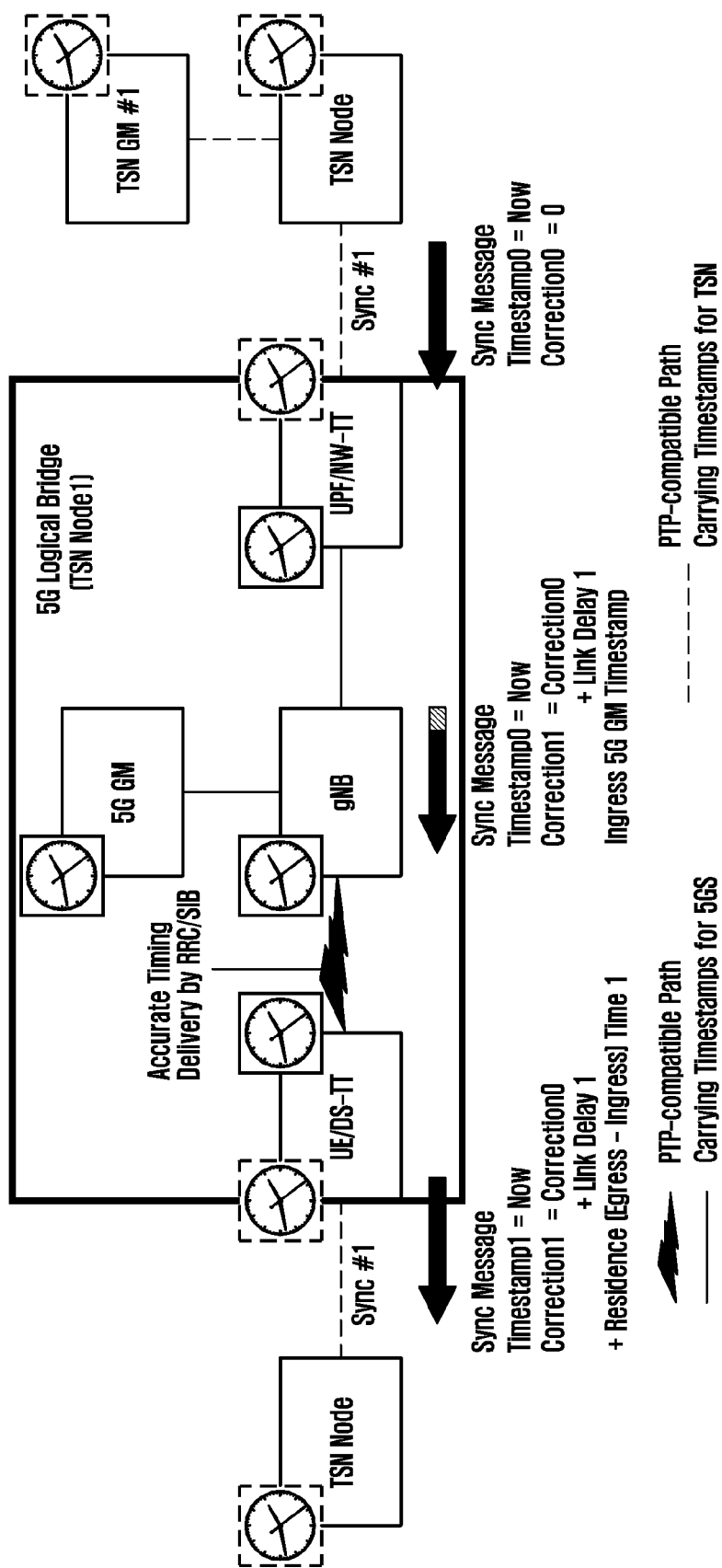
FIG. 3 illustrates a conceptual diagram of a method of supporting TSN time synchronization in a 5G network.

FIG. 3 illustrates a conceptual diagram of a method of supporting TSN time synchronization in a 5G network.

Referring to FIG. 3, in a method by which the 5G network supports TSN, the 5G network may be modeled as one TSN bridge (TSN node) of FIG. 1 in a situation illustrated in FIG. 2. For example, in the 5G network, a User Plane Function (UPF), a gNB, and a UE are one TSN node, and may support TSN by correcting a link delay and a residence time to update a synchronization frame. To this end, it is assumed that the UPF, the gNB, and the UE within the 5G network are synchronized with the 5G GM. For example, the gNB may be connected to a Global Positioning System (GPS) and the UPF may be connected to the gNB through Ethernet-based TSN to be synchronized with the gNB, and the UE may be synchronized with the gNB through a process of transmitting and receiving a Physical (PHY) frame (DL/UL synchronization). The UPF may be connected to a TSN node of a wired network, and the UE may be connected to the TSN node of the wired network. Since the GM of TSN is located at the TSN node connected to the UPF in the example of FIG. 3, the UPF may receive a sync frame from the previous TSN node. The UPF may record a time based on the received 5G GM of the sync frame as an ingress time. The UPF may periodically calculate a link delay with the TSN node. The UPF may transfer the sync frame including the ingress time and the link delay to the UE. When transmitting the sync frame to the next TSN node, the UE may calculate a residence time which is a time spent in the 5G network on the basis of a time based on the 5G GM corresponding to an egress time. The residence time may be calculated as a time difference between the egress time and the ingress time (Residence Time=Egress Time−Ingress Time). The UE may update a correction field using the residence time and the link delay and transmit the sync frame to the next TSN node.

Figure 4:
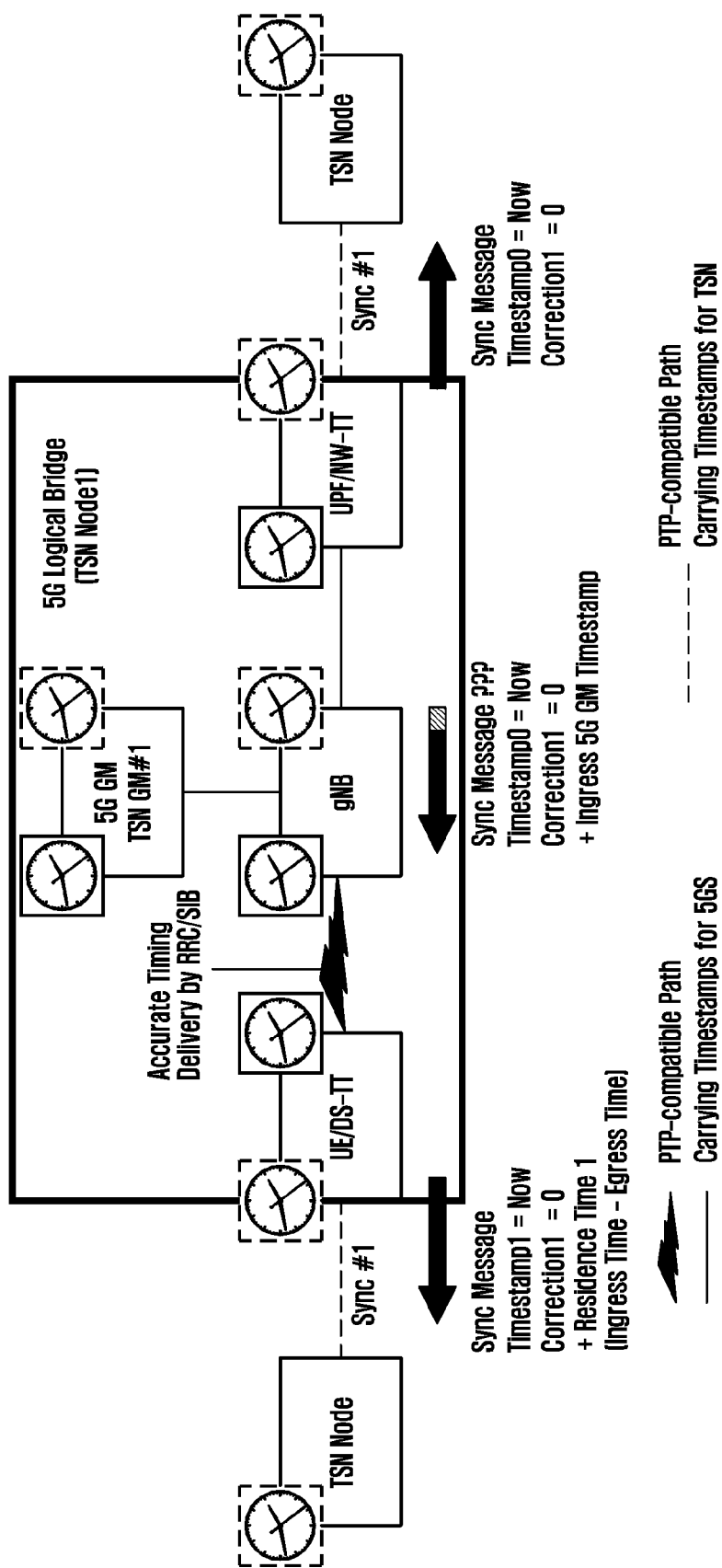
FIG. 4 illustrates a conceptual diagram of a method by which an NW-TT generates a synchronization message in a communication system and provides synchronization to a node located outside the 5GS according to an embodiment.

FIG. 4 illustrates a conceptual diagram of a method by which an NW-TT generates a synchronization message in a communication system and provides synchronization to a node located outside the 5GS according to an embodiment.

Referring to FIG. 4, the NW-TT may generate a synchronization message and transmit the synchronization message in a direction of access by wired nodes. At this time, a timestamp of the synchronization message may indicate a time at which the synchronization message is generated. Also, the NW-TT may perform an operation of receiving a TSN synchronization message as illustrated in FIG. 3. Herein, description that is the same as that of FIG. 3 is omitted. The NW-TT may input the time at which the synchronization message is generated into an ingress time field and then transmit the synchronization message to a DS-TT. At this time, the link delay included in the correction field may be 0. The DS-TT may determine the residence time for which the synchronization message stays in the 5G network on the basis of the egress time which is the time at which the synchronization message is transmitted to a communication node outside the 5GS. The UE may update the correction field on the basis of the residence time and the link delay and transmit the synchronization frame to the next TSN node.

Figure 5:
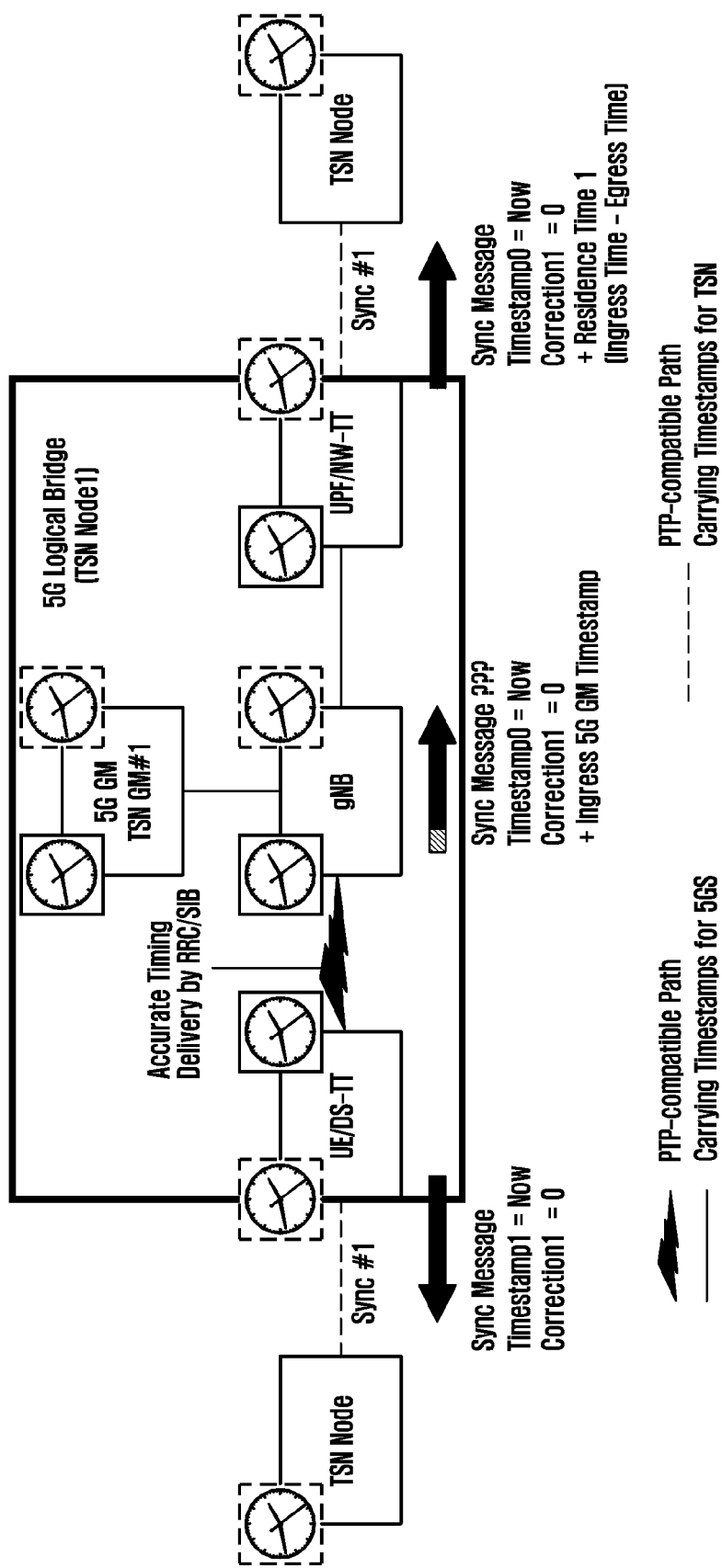
FIG. 5 illustrates a conceptual diagram of a method by which a DS-TT generates a synchronization message in a communication system and provides the synchronization message to a node located outside the 5GS according to an embodiment.

FIG. 5 illustrates a conceptual diagram of a method by which the DS-TT generates a synchronization message in a communication system and provides the synchronization message to a node located outside the 5GS according to an embodiment.

Referring to FIG. 5, the DS-TT may generate a synchronization message and transmit the synchronization message to external nodes connected to the DS-TT. At this time, a timestamp of the synchronization message may indicate a time at which the synchronization message is generated. Also, the DS-TT may perform an operation of receiving the synchronization message from the external node. Other operations of the DS-TT may be performed as opposite to the operation order of FIG. 3. The DS-TT may input the time at which the synchronization message is generated into an ingress time field and transmit the synchronization message to the NW-TT. At this time, the link delay included in the correction field may be 0. The NW-TT may determine the residence time for which the synchronization message stays in the 5G network on the basis of the egress time which is the time at which the synchronization message is transmitted to a node located outside the 5GS. The NW-TT may update the correction field on the basis of the residence time and the link delay and transmit the synchronization frame to the next TSN node.

Figure 6:
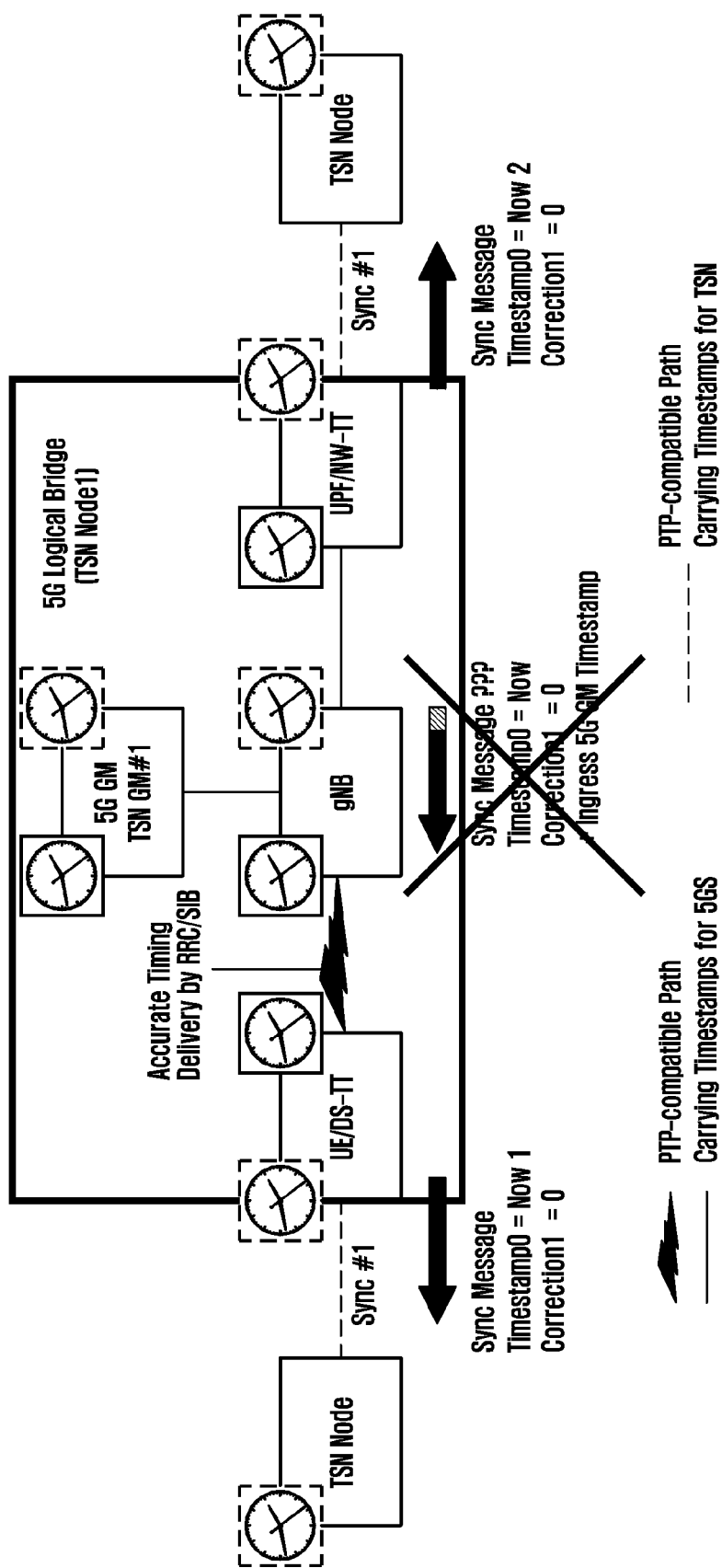
FIG. 6 illustrates a conceptual diagram of a method by which each of the NW-TT and the DS-TT generates a synchronization message in a communication system and provides synchronization to a node located outside the 5GS according to an embodiment.

FIG. 6 illustrates a conceptual diagram of a method by which each of an NW-TT and a DS-TT generates a synchronization message in a communication system and provides synchronization to a node located outside the 5GS according to an embodiment.

The NW-TT may generate a synchronization message and transmit the synchronization message in a direction of access by wired nodes. At this time, a timestamp of the synchronization message may indicate a time at which the synchronization message is generated. The DS-TT may generate a synchronization message and transmit the synchronization message to external nodes connected to the DS-TT. At this time, a timestamp of the synchronization message may indicate a time at which the synchronization message is generated. The NW-TT and the DS-TT may transmit the synchronization message through the method illustrated in FIG. 4 or 5 or may not transmit the synchronization message. For example, when the synchronization message is not transmitted, the generation of traffic may be reduced, load of the terminal/equipment may be reduced, and power consumption may be reduced.

Figure 7:
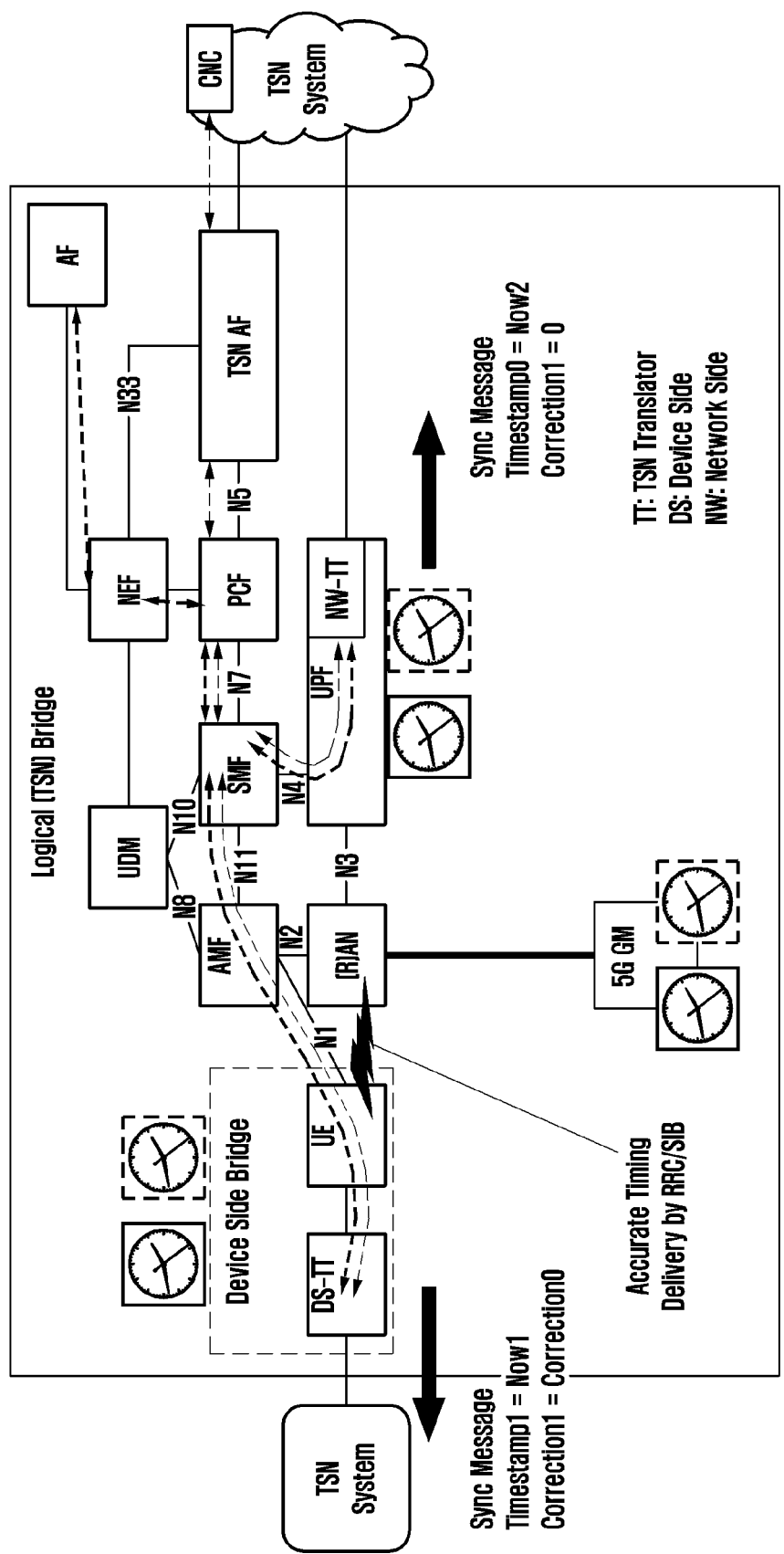
FIG. 7 illustrates a conceptual diagram of a method of configuring a 5GS as a synchronization source in a communication system according to an embodiment.

FIG. 7 illustrates a conceptual diagram of a method of configuring a 5GS as a synchronization source in a communication system according to an embodiment.

Referring to FIG. 7, when the 5GS links with a TSN system, a TSN Application Function (AF) may interwork with a Centralized Network Configuration (CNC) server and exchange management information. The TSN AF may acquire management information of the NW-TT and the DS-TT, transfer the management information to the NW-TT and the DS-TT, and change a configuration. Through the above process, the 5GS may be configured as illustrated in FIG. 4, 5, or 6.

When the 5GS does not interwork with the TSN system, a separate AF, rather than TSN AF, may make a configuration for the NW-TT and the DS-TT similarly to the configuration for the TSN AF. At this time, the AF may be connected to an internal network of the 5GS via an NEF. Hereinafter, an embodiment in which the AF is connected via the NEF is described. The AF may be configured through the configuration process for the NW-TT and the DS-TT as illustrated in FIG. 4, 5, or 6. Particularly, when the 5GS does not interwork with the TSN system, the method of transmitting the synchronization message to the node located outside the 5GS is not fixed to a scheme using a gPTP, but a Precision Time Protocol (PTP) may be transmitted through an Ethernet message or a UDP/IP message.

In the disclosure, the DS-TT may be implemented in the terminal. Further, in the disclosure, the NW-TT may be implemented in a network function (NF_entity of a core network, such as a UPF, an AMF, or the like, and the NW-TT is implemented on the UPF in FIGS. 8 to 12.

Figure 8:
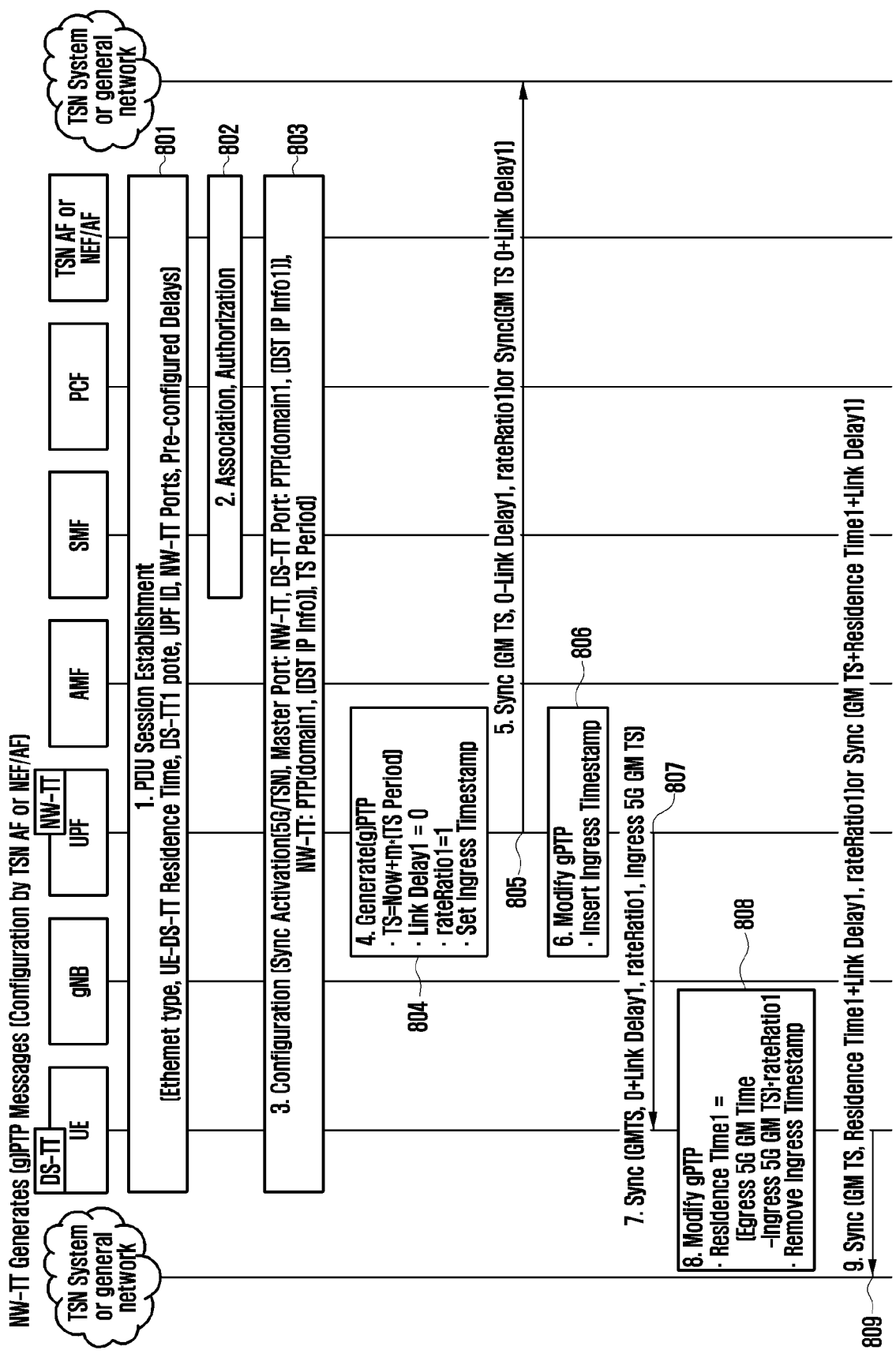
FIG. 8 illustrates a flowchart of the flow of a signal for generating a synchronization message by the NW-TT and providing synchronization to a node located outside the 5GS in a communication system according to an embodiment.

FIG. 8 illustrates a flowchart of the flow of a signal for generating a synchronization message by the NW-TT and providing synchronization to a node located outside the 5GS in a communication system according to an embodiment.

In operation 801, the DS-TT may establish a required connection with a TSN AF, an AF, or an AF via a Network Exposure Function (NEF) while generating a PDU session. At this time, parameters of the DS-TT and the PDU session may be transferred to the TSN AF, the AF, or an AF via a Network Exposure Function (NEF).

In operation 802, association may be established between a Session Management Function (SMF) and a Policy Control Function (PCF) and between the PCF and the TSN AF, the AF, or an AF via a Network Exposure Function (NEF).

In operation 803, the TSN AF, the AF, or an AF via a Network Exposure Function (NEF) may make a configuration for the DS-TT and the NW-TT. For example, for the NW-TT, the AF may configure generation of a synchronization message including a parameter for sync activation indicating that the 5GS or the TSN GM is a synchronization source and a parameter indicating that the master port is the NW-TT. Further, the AF may designate a format of a synchronization message transmitted to the outside of a DS-TT port and an NW-TT port as a gPTP/PTP. The AF may designate a supported synchronization domain. In the case of transmission through a UDP/IP in the PTP format, a destination IP address may be configured. Referring to FIG. 8, the DS-TT port and the NW-TT port may support the same domain. A transmission period of the synchronization message may be common, and thus the synchronization message may include a common timestamp (TS) period as a parameter.

In operation 804, the NW-TT may generate a synchronization message. As designated in operation 803, the synchronization message may have a gPTP message format or a PTP message format. At this time, a time of the timestamp may be determined on the basis of the time at which the synchronization message is generated, and a time of a timestamp generated in future may be determined on the basis of a configured timestamp period. Further, link delay 1 may be configured as 0, and rate ratio 1 (rateRatio1) may be configured as 1. An ingress timestamp included in the gPTP message transmitted from the NW-TT to the DS-TT may be configured as the time at which the synchronization message is generated.

In operation 805, the NW-TT may transmit the synchronization message to an external node. For example, in the case of the gPTP message, a Grand Master (GM) Time Stamp (TS) and a correction field may be configured as 0, and rate ratio 1 (rateRatio1) may be configured as 1. The PTP message may be corrected to be a value obtained by adding the correction field to the GM TS. At this time, since the correction field value is 0, only the GM TS value may be reflected in actual.

Before transmitting the generated synchronization message to the DS-TT in the (g)PTP format in operation 804, the NW-TT may insert an ingress timestamp into the synchronization message in operation 806.

In operation 807, the NW-TT may transmit the synchronization message to the DS-TT. In the synchronization message, the GM TS and the correction field may be configured as 0, rate ratio 1 (rateRatio1) may be configured as 1, and the ingress timestamp may be configured as the GM TS.

In operation 808, the DS-TT may determine residence time 1 before transmitting the (g)PTP message received from the NW-TT to the external node. Residence time 1 may be calculated as (Egress Time−Ingress Time)*rateRatio1 on the basis of the egress time which is the time at which the synchronization message is transmitted to the external node. At this time, both the egress time and the ingress time are based on the 5GS GM, and rate ratio 1 (rateRatio1) may be a value received from the NW-TT, that is, 1 in operation 807. The ingress timestamp field of the synchronization message finally transmitted to the outside may be deleted.

In operation 809, the DS-TT may transmit the synchronization message to the external node. In the case of the gPTP format, the GM TS and the correction field value may indicate 1 as residence time 1 and the rate ratio (rateRatio) calculated in operation 808. In the case of the PTP format, the GM TS and the correction field value may be updated to a value obtained by adding residence time 1 calculated in operation 8 and reflected in the timestamp.

Figure 9:
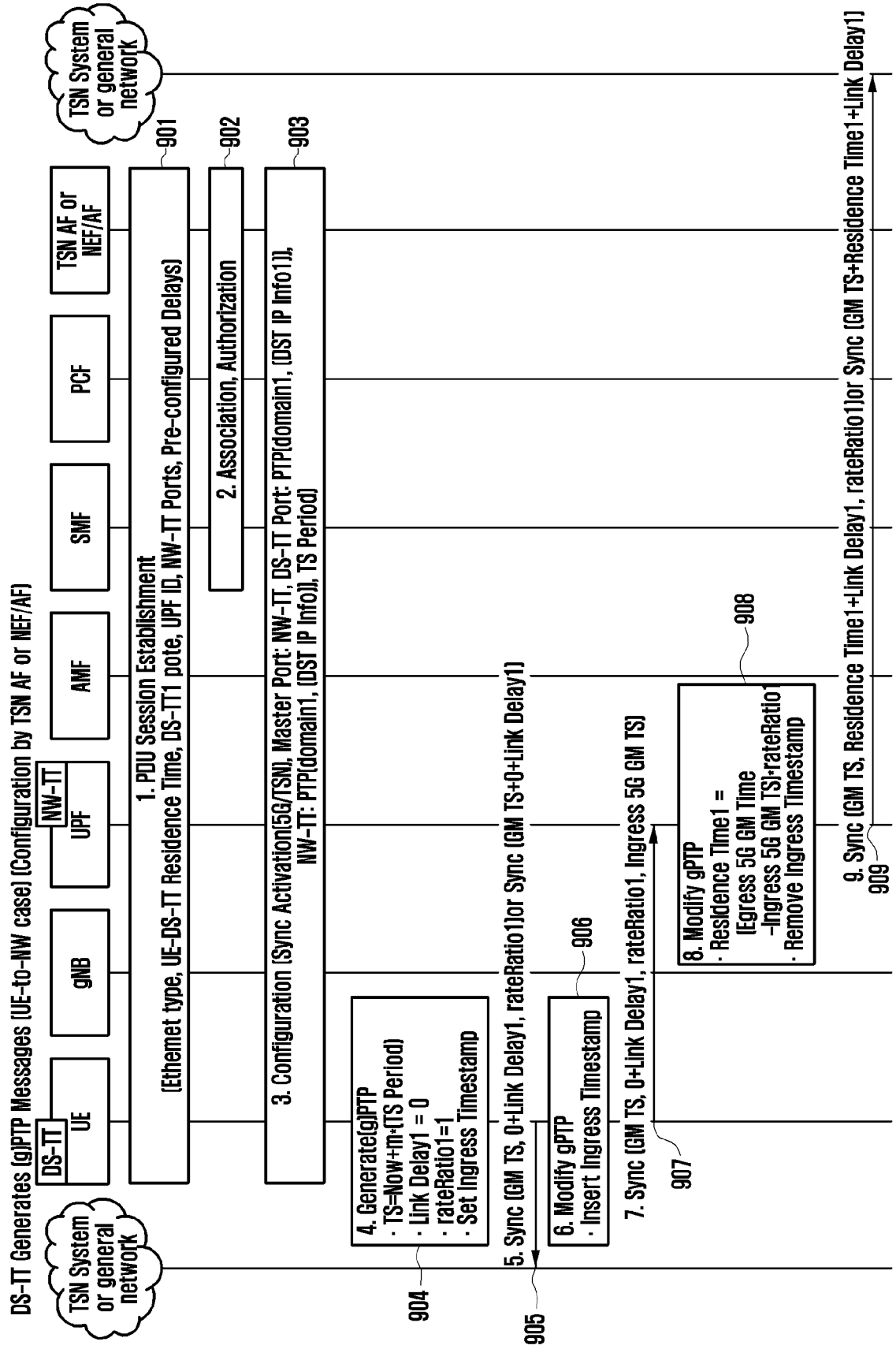
FIG. 9 illustrates a flowchart of the flow of a signal for generating a synchronization message by the DS-TT and providing synchronization to a node located outside the 5GS in a communication system according to an embodiment.

FIG. 9 illustrates a flowchart of the flow of a signal for generating a synchronization message by the DS-TT and providing synchronization to a node located outside the 5GS in a communication system according to an embodiment.

In operation 901, the DS-TT may generate a PDU session and establish a required connection with a TSN AF, an AF, or an AF via an NEF. At this time, parameters of the DS-TT and the PDU session may be transferred to the TSN AF, the AF, or an AF via a Network Exposure Function (NEF).

In operation 902, association may be established between the SMF and the PCF and between the PCF and the TSN AF, the AF, or an AF via a Network Exposure Function (NEF).

In operation 903, the TSN AF, the AF, or an AF via a Network Exposure Function (NEF) may make a configuration for the DS-TT and the NW-TT. At this time, the AF may configure generation of the synchronization message including a parameter for synchronization activation indicating that the 5GS or the TSN GM is a synchronization source and a parameter indicating that the master port is the DS-TT. Further, the AF may designate a format of the synchronization message transmitted from the DS-TT port and the NW-TT port to the outside as a gPTP/PTP. The AF may designate a supported synchronization domain. In the case of the PTP format, when the synchronization message is transmitted through the UDP/IP, the AF may configure a destination IP address. Referring to FIG. 9, the DS-TT port and the NW-TT port may support the same domain. Since the synchronization message may have a common transmission period, the common TS period may be included as a parameter.

In operation 904, the DS-TT may generate the synchronization message. As designated in operation 903, the synchronization message may have the gPTP message format or the PTP message format. At this time, an initial timestamp may be determined on the basis of the time at which the synchronization message is generated and a timestamp generated in future may be determined on the basis of a configured timestamp period. Further, link delay 1 of the synchronization message may be configured as 0, and rate ratio 1 (rateRatio1) may be configured as 1. An ingress timestamp included in the gPTP message transmitted from the DS-TT to the NW-TT may be configured on the basis of the time at which the synchronization message is generated.

In operation 905, the DS-TT may transmit the synchronization message to the external node. The GM TS and the correction field value of the gPTP message may be configured as 0, and rate ratio 1 (rateRatio1) may be configured as 1. The GM TS of the PTP message may be corrected to a value obtained by adding the correction field value. At this time, since the correction field value is 0, the GM TS value may be the same as the value before the correction.

Before transmitting the generated synchronization message to the NW-TT in the (g)PTP format in operation 904, the DW-TT may configure an ingress timestamp value in operation 906.

In operation 907, the DS-TT may transmit the synchronization message to the NW-TT. In the synchronization message, the GM TS and the correction field value may be configured as 0, rate ratio 1 (rateRatio1) may be configured as 1, and the ingress timestamp value may be configured as the GM TS.

In operation 908, the NW-TT may determine residence time 1 before transmitting the gPTP message received from the DS-TT to the external node. For example, residence time 1 may be calculated as (Egress Time−Ingress Time)*rateRatio1 on the basis of the egress time which is the time at which the synchronization message is transmitted to the external node. At this time, both the egress time and the ingress time are based on the 5GS GM, and rate ratio 1 (rateRatio1) may be a value received from the DS-TT, that is, 1 in operation 7. The ingress timestamp field of the synchronization message finally transmitted to the outside may be deleted.

In operation 909, the NW-TT may transmit the synchronization message to the external node. In the case of the gPTP format, the GM TS of the synchronization message and the correction field may be configured as 1 corresponding to residence time 1 and rate ratio 1 (rateRatio) determined in operation 908. In the case of the PTP format, the GM TS of the synchronization message and the correction field value may be updated to a value obtained by adding residence time 1 determined in operation 908 and reflected in the timestamp.

Figure 10:
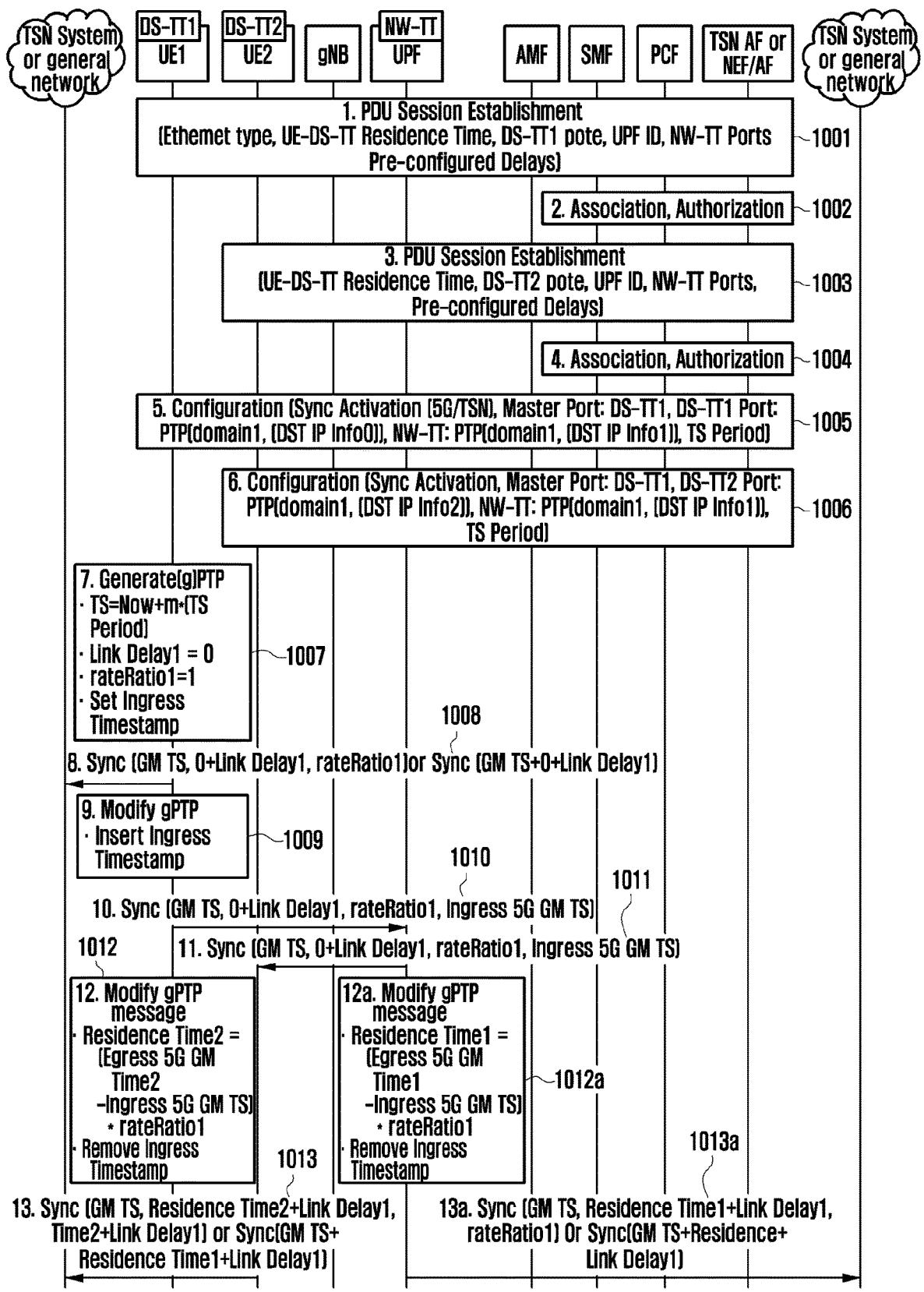
FIG. 10 illustrates a flowchart of the flow of a signal for generating a synchronization message by the DS-TT and providing synchronization to a node located outside the 5GS when a UE-to-UE transmission interval is included in a communication system according to an embodiment.

FIG. 10 illustrates a flowchart of the flow of a signal for generating a synchronization message by the DS-TT and providing synchronization to a node located outside the 5GS when a UE-to-UE transmission interval is included in a communication system according to an embodiment.

Referring to FIG. 10, DS-TT 1 may establish a required connection with a TSN AF, an AF, or an AF via an NEF while generating a PDU session in operation 1001. At this time, parameters of DS-TT 1 and the PDU session may be transferred to the TSN AF, the AF, or an AF via a Network Exposure Function (NEF).

In operation 1002, association may be established between the SMF and the PCF and between the PCF and the TSN AF, the AF, or an AF via a Network Exposure Function (NEF).

In operation 1003, DS-TT 2 may establish a required connection with the TSN AF, the AF, or an AF via a Network Exposure Function (NEF) while generating the PDU session. At this time, parameters of DS-TT 2 and the PDU session may be transferred to the TSN AF, the AF, or an AF via a Network Exposure Function (NEF).

In operation 1004, association may be established between the SMF and the PCF and between the PCF and the TSN AF, the AF, or an AF via a Network Exposure Function (NEF).

In operation 1005, the TSN AF, the AF, or an AF via a Network Exposure Function (NEF) may make a configuration for DS-TT 1 and the NW-TT. At this time, the AF may configure generation of the synchronization message including a parameter for synchronization activation indicating that the 5GS or the TSN GM is a synchronization source and a parameter indicating that the master port is DS-TT 1. Further, the AF may designate a format of the synchronization message transmitted from a DS-TT 1 port and the NW-TT port to the outside as a gPTP/PTP. The AF may designate a supported synchronization domain. In the case of the PTP format, when the synchronization message is transmitted through the UDP/IP, the AF may configure a destination IP address. Referring to FIG. 10, DS-TT 1 port and the NW-TT port may support the same domain. Since the synchronization message may have a common transmission period, the common TS period may be configured as a parameter.

In operation 1006, the TSN AF, the AF, or an AF via a Network Exposure Function (NEF) may make a configuration for DS-TT 2 and the NW-TT. At this time, the AF may configure generation of the synchronization message including a parameter for synchronization activation indicating that the 5GS or the TSN GM is a synchronization source and a parameter indicating that the master port is DS-TT 1. Further, the AF may designate a format of the synchronization message transmitted from DS-TT 2 port and the NW-TT port to the outside as a gPTP/PTP. The AF may designate a supported synchronization domain. In the case of the PTP format, when the synchronization message is transmitted through the UDP/IP, the AF may configure a destination IP address. Referring to FIG. 10, DS-TT 2 port and the NW-TT port may support the same domain. Since the synchronization message may have a common transmission period, a parameter for the common TS period may be configured.

In operation 1007, DS-TT 1 may generate the synchronization message. As designated in operation 1005, the synchronization message may have the gPTP message format or the PTP message format. At this time, the timestamp may be determined on the basis of the generation time, and a time of a timestamp generated in the future may be configured on the basis of a configured TS period. Further, link delay 1 may be configured as 0, and a rate ratio 1 (rateRatio1) may be configured as 1. An ingress timestamp included in the gPTP message transmitted from DS-TT 1 to the NW-TT may also be configured on the basis of the generation time.

In operation 1008, DS-TT 1 may transmit the synchronization message to the external node. The GM TS of the gPTP message and the correction field value may be configured as 0, and rate ratio 1 (rateRatio1) may be configured as 1. The GM TS of the PTP message may be corrected to a value obtained by adding the correction field value. At this time, since the correction field value is 0, the GM TS value may be the same as the value before the correction.

Before transmitting the synchronization message generated in operation 1007 to the NW-TT in the (g)PTP format, DS-TT 1 may configure an ingress timestamp value in operation 1009.

In operation 1010, DS-TT 1 may transmit the synchronization message to the NW-TT. The GM TS of the synchronization message and the correction field value may be configured as 0, rate ratio 1 (rateRatio1) may be configured as 1, and the ingress timestamp value may be configured as the GM TS.

In operation 1011, the NW-TT may transmit the synchronization message received in operation 10 to DS-TT 2 without any change. In the synchronization message, the GM TS value and the correction field value may be configured as 0, rate ratio 1 (rateRatio1) may be configured as 1, and the ingress timestamp value may be configured as the GM TS value.

In operation 1012, DS-TT 2 may determine residence time 2 before transmitting the gPTP message received from the NW-TT in operation 1011 to the external node. For example, DS-TT 2 may calculate residence time 2 as (Egress Time−Ingress Time)*rateRatio1 on the basis of egress time 2 which is the time at which the synchronization message is transmitted to the external node. At this time, both egress time 2 and the ingress time may be based on the 5GS GM, and rateRatio 1 may be a value configured by DS-TT 1, that is, 1 in operation 1008. DS-TT 2 may delete the ingress timestamp field of the synchronization message finally transmitted to the outside.

In operation 1012a, the NW-TT may determine residence time 1 before transmitting the gPTP message received from DS-TT 1 to the external node. The NW-TT may calculate residence time 1 as (Egress Time1−Ingress Time)*rateRatio1 on the basis of egress time 1 which is the time at which the synchronization message is transmitted to the external node. At this time, both egress time 1 and the ingress time may be based on the 5GS GM, and rateRatio 1 may be a value configured by DS-TT 1, that is, 1 in operation 1008. The NW-TT may delete the ingress timestamp field of the synchronization message finally transmitted to the outside.

In operation 1013, DS-TT 2 may transmit the synchronization message to the external node. In the case of the gPTP format, the GM TS value of the synchronization message and the correction field may be configured as 1 corresponding to residence time 2 and the rate ratio 1 (rateRatio1) calculated in operation 1008. In the case of the PTP format, the GM TS value of the synchronization message and the correction field value may be updated to a value obtained by adding residence time 2 calculated in operation 1008 and reflected in the timestamp.

In operation 1013a, the NW-TT may transmit the synchronization message to the external node. In the case of the gPTP format, the GM TS value of the synchronization message and the correction field value may be configured as 1 corresponding to residence time 1 and the rate ratio 1 (rateRatio1) calculated in operation 1008. In the case of the PTP format, the GM TS of the synchronization message and the correction field value may be updated to a value obtained by adding residence time 1 calculated in operation 8 and reflected in the timestamp.

Figure 11:
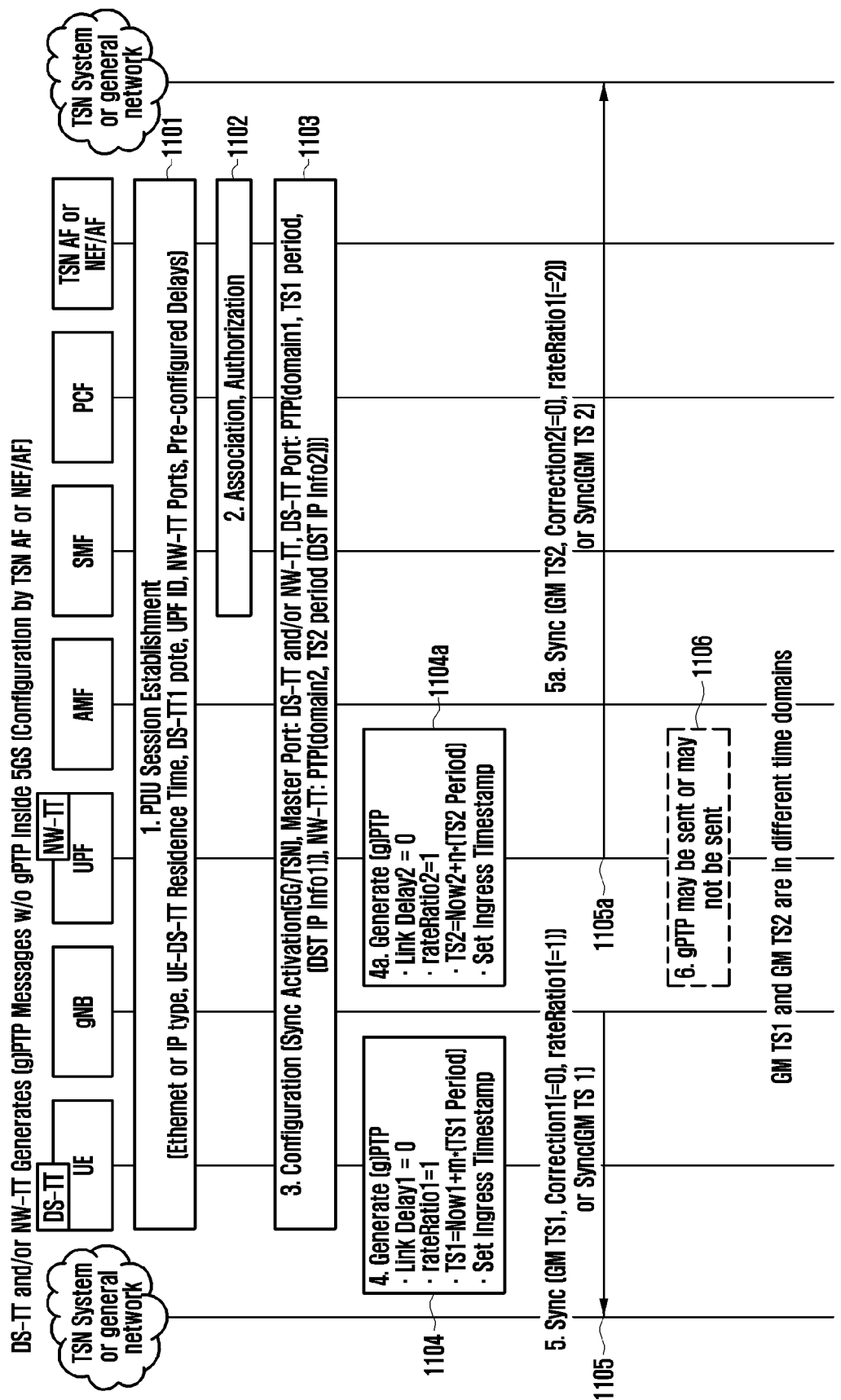
FIG. 11 illustrates a flowchart of the flow of a signal for generating a synchronization message by each of the NW-TT and the DS-TT and providing synchronization to a node located outside the 5GS in a communication system according to an embodiment.

FIG. 11 illustrates a flowchart of the flow of a signal for generating a synchronization message by each of the NW-TT and the DS-TT and providing synchronization to a node located outside the 5GS in a communication system according to an embodiment.

Referring to FIG. 11, the DS-TT may establish a required connection with a TSN AF, an AF, or an AF via an NEF while generating a PDU session in operation 1101. At this time, parameters of the DS-TT and the PDU session may be transferred to the TSN AF, the AF, or an AF via a Network Exposure Function (NEF).

In operation 1102, association may be established between the SMF and the PCF and between the PCF and the TSN AF, the AF, or an AF via a Network Exposure Function (NEF).

In operation 1103, the TSN AF, the AF, or an AF via a Network Exposure Function (NEF) may make a configuration for the DS-TT and the NW-TT. At this time, the AF may make a configuration such that a sync message including a synchronization activation parameter indicating that the 5GS or the TSN GM is a synchronization source and a parameter indicating that the master port is the DS-TT and/or the NW-TT are generated by both the DS-TT and the NW-TT, the DS-TT, or the NW-TT. Further, a format of the synchronization message transmitted from the DS-TT port and the NW-TT port to the outside may be designated to the gPTP/PTP. Further, in the synchronization message, a supported synchronization domain may be designated. In the case of the PTP format, when transmission is performed through the UDP/IP, a destination IP address may be configured in the synchronization message. Referring to FIG. 11, each of the DS-TT port and the NW-TT port may support a separate domain. Further, the synchronization message may have a separate transmission period and thus include a parameter for each TS period.

In operation 1104, the DS-TT may generate the synchronization message. As designated in operation 1103, the synchronization message may have the gPTP message format or the PTP message format. At this time, TS 1 corresponding to the timestamp may be based on the generation time, and a future generation time e may be configured on the basis of TS period 1. Further, link delay 1 may be configured as 0, and a rate ratio 1 (rateRatio1) may be configured as 1. An ingress timestamp included in the gPTP message transmitted from the DS-TT to the NW-TT may also be configured on the basis of the generation time.

In operation 1104a, the NW-TT may generate the synchronization message. As designated in operation 1103, the synchronization message may have the gPTP message format or the PTP message format. At this time, TS 2 corresponding to the timestamp may be based on the generation time, and the future generation time may be configured on the basis of configured TS period 2. Further, link delay 2 may be configured as 0, and rate ratio 2 (rateRatio2) may be configured as 1. An ingress timestamp included in the gPTP message transmitted from the NW-TT to the DS-TT may be configured on the basis of the generation time.

In operation 1105, the DS-TT may transmit the synchronization to the external node. The GM TS 1 value of the gPTP message and the correction field value may be configured as 0, and the rate ratio 1 (rateRatio1) value may be configured as 1. The GM TS 1 value of the PTP message may be corrected to a value obtained by adding the correction field value. Since the correction field value is 0, the GM TS 1 value may be the same as the value before correction.

In operation 1105a, the NW-TT may transmit the synchronization message to the external node. The GM TS 2 value of the gPTP message and the correction field value may be configured as 0, and the rate ratio 2 (rateRatio2) value may be configured as 1. The GM TS 2 value of the PTP message may be corrected to a value obtained by adding the correction field value. Since the correction field value is 0, the GM TS 2 value may be the same as the value before correction.

Like in operations 804, 806, 807, and 808 of FIG. 8 or operations 904, 906, 907, and 908 of FIG. 9, the synchronization message in the gPTP format may be transmitted from the NW-TT to the DS-TT or from the DS-TT to the NW-TT in operation 1106. Alternatively, the sync message in the gPTP format may not be transmitted between the NW-TT and the DS-TT. When the synchronization message is not transmitted, the generation of traffic may be reduced, load of the terminal/equipment may be reduced, and power consumption may be reduced.

Figure 12:
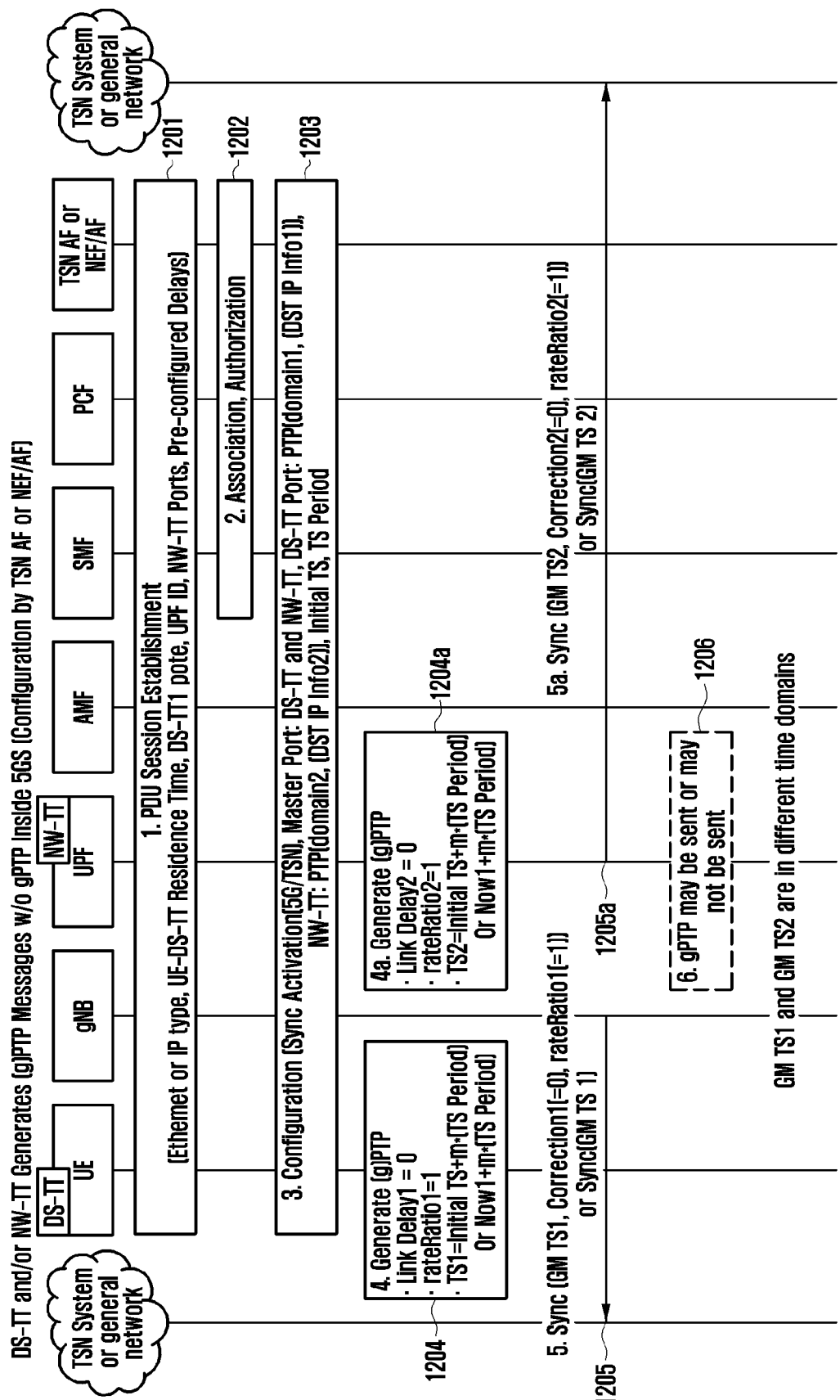
FIG. 12 illustrates a flowchart of the flow of a signal for generating a synchronization message equally configured by the NW-TT and the DS-TT and providing synchronization to a node located outside the 5GS in a communication system according to an embodiment.

FIG. 12 illustrates a flowchart of the flow of a signal for generating a synchronization message equally configured by the NW-TT and the DS-TT and providing synchronization to a node located outside the 5GS in a communication system according to an embodiment.

Referring to FIG. 12, the DS-TT may establish a required connection with a TSN AF, an AF, or an AF via an NEF while generating a PDU session in operation 1201. At this time, parameters of the DS-TT and the PDU session may be transferred to the TSN AF, the AF, or an AF via a Network Exposure Function (NEF).

In operation 1202, association may be established between the SMF and the PCF and between the PCF and the TSN AF, the AF, or an AF via a Network Exposure Function (NEF).

In operation 1203, the TSN AF, the AF, or an AF via a Network Exposure Function (NEF) may make a configuration for the DS-TT and the NW-TT. At this time, the AF may configure the DS-TT and the NW-TT to generate the sync message including a parameter for synchronization activation indicating that the 5GS or the TSN GM is a synchronization source and a parameter indicating that the master port is the DS-TT and the NW-TT. Further, a format of the synchronization message transmitted from the DS-TT port and the NW-TT port to the outside may be designated to the gPTP/PTP. Further, in the synchronization message, the same synchronization domain may be designated. In the case of the PTP format, when transmission is performed through the UDP/IP, a destination IP address may be configured in the synchronization message. Referring to FIG. 12, each of the DS-TT port and the NW-TT port may support a separate domain. Referring to FIG. 12, the synchronization message may have a common transmission period and thus include a parameter for a common TS period. The synchronization message may include a parameter for an initial TS to have the same timestamp.

In operation 1204, the DS-TT may generate the synchronization message. As designated in operation 1203, the synchronization message may have the gPTP message format or the PTP message format. At this time, TS1 which is the timestamp may start from an initial TS and may be generated on the basis of a time of a TS period, and a future generation time may be configured on the basis of a configured TS period. Alternatively, the timestamp of the synchronization message may be configured on the basis of the common TS period regardless of the initial TS. Further, link delay 1 may be configured as 0, and a rate ratio 1 (rateRatio1) may be configured as 1. An ingress timestamp included in the gPTP message transmitted from the DS-TT to the NW-TT may also be configured on the basis of the time at which the message is generated.

In operation 1204*a*, the NW-TT may generate the synchronization message. As designated in operation 1203, the synchronization message may have the gPTP message format or the PTP message format. At this time, TS 2 which is the timestamp may start from an initial TS and may be generated on the basis of a time of a TS period, and a future generation time may be configured on the basis of a configured TS period. Alternatively, the timestamp of the synchronization message may be configured on the basis of the common TS period regardless of the initial TS. Further, link delay 2 may be configured as 0, and rate ratio 2 (rateRatio2) may be configured as 1. An ingress timestamp included in the gPTP message transmitted from the NW-TT to the DS-TT may be configured on the basis of the generation time.

In operation 1205, the DS-TT may transmit the synchronization message to the external node. The GM TS 1 value of the gPTP message and the correction field value may be configured as 0, and the rate ratio 1 (rateRatio1) value may be configured as 1. The GM TS 1 value of the PTP message may be corrected to a value obtained by adding the correction field value. Since the correction field value is 0, the GM TS1 value may be the same as the value before correction.

In operation 1205*a*, the NW-TT may transmit the synchronization message to the external node. The GM TS 2 value of the gPTP message and the correction field value may be configured as 0, and the rate ratio 2 (rateRatio2) value may be configured as 1. The GM TS 2 value of the PTP message may be corrected to a value obtained by adding the correction field value. Since the correction field value is 0, the GM TS 2 value may be the same as the value before correction.

Like in operations 804, 806, 807, and 808 of FIG. 8 or operations 904, 906, 907, and 908 of FIG. 9, the synchronization message in the gPTP format may be transmitted from the NW-TT to the DS-TT or from the DS-TT to the NW-TT in operation 1206. Alternatively, the synchronization message in the gPTP format may not be transmitted between the NW-TT and the DS-TT. When the synchronization message is not transmitted, the generation of traffic may be reduced, load of the terminal/equipment may be reduced, and power consumption may be reduced.

Figure 13:
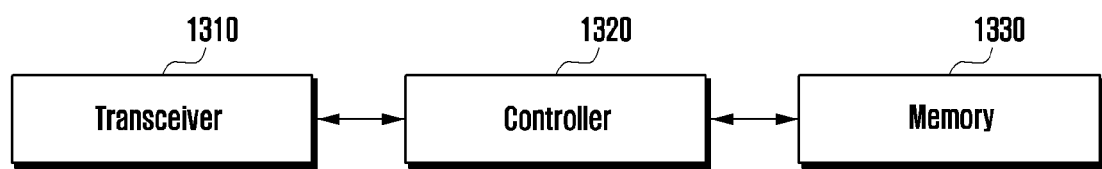
FIG. 13 illustrates a block diagram of a terminal according to an embodiment.

FIG. 13 illustrates a block diagram of a terminal according to an embodiment.

Referring to FIG. 13, the terminal (UE) may include a transceiver 1310, a controller 1320, and a memory 1330. The terminal may additionally have more elements according to an implementation scheme. For example, various additional devices such as a display, an input unit, a sensor, and the like for a user interface may be further included. In the disclosure, there is no limitation on such additional elements.

The transceiver 1310 may be connected to a base station through a radio channel on the basis of embodiments illustrated in FIGS. 1 to 12 and transmit and receive signals and/or messages to and from various network functional devices through the base station. For example, the terminal may be the DS-TT. When the terminal communicates with a 5G network, the transceiver 1310 may be a device capable of performing transmission/reception with the 5G communication network. Further, the transceiver 1310 may include a communication processor as necessary.

When the transceiver 1310 does not include the communication processor, all signals and/or messages may be processed by a controller.

The controller 1320 may control the basic operation of the terminal and control reception and storage of the above-described messages. For example, the controller 1320 may control the operation of the terminal on the basis of the above description.

The memory 1330 may store various pieces of data required for the control of the terminal and may have an area for storing various commands for the above-described various operations of the terminal.

Figure 14:
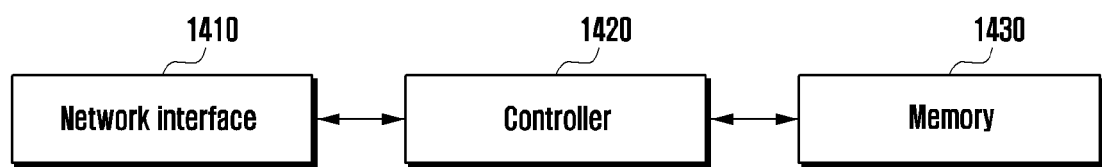
FIG. 14 illustrates a block diagram of a base station according to an embodiment.

FIG. 14 illustrates a block diagram of a base station according to an embodiment.

Referring to FIG. 14, a base station (gNB) may include a network interface 1410, a controller 1420, and a memory 1430. The base station may additionally have more elements according to an implementation scheme. For example, various additional devices such as a display, an input unit, a sensor, and the like for a user interface may be further included. In the disclosure, there is no limitation on such additional elements.

The network interface 1410 may be connected to a terminal through a radio channel on the basis of the embodiments illustrated in FIGS. 1 to 12 and transmit and receive signals and/or messages to and from various network functional devices. When the base station communications with a 5G network, the network interface 1410 may be a device capable of performing transmission/reception with the 5G communication network and may be called a transceiver. Further, the network interface 1410 may include a communication processor as necessary.

When the network interface 1410 does not include the communication processor, all signals and/or messages may be processed by a controller.

The controller 1420 may control the basic operation of the base station and control reception and storage of the above-described messages. For example, the controller 1420 may control the operation of the base station on the basis of the above description.

The memory 1430 may store various pieces of data required for the control the base station and may have an area for storing various commands for the operation of the base station.

Figure 15:
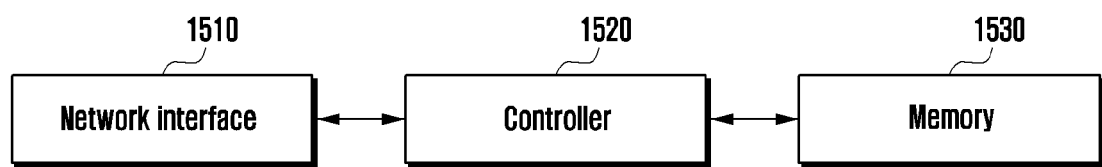
FIG. 15 illustrates a block diagram of Network Function (NF) entities according to an embodiment.

FIG. 15 illustrates a block diagram of Network Function (NF) entities according to an embodiment. The NF entities illustrated in FIG. 15 are entities that perform network functions of the core network and include at least one of the AFM, the SMF, the UPF, the PCF, and the TSN AF, but are not limited to specific NFs. Meanwhile, the UPF which is one of the NF entities of the disclosure may perform an operation based on the embodiments illustrated in FIGS. 1 to 12. For example, the UPF may be the NW-TT.

Referring to FIG. 15, the NF entities may communicate with other network entities of the core network through a network interface 1510. For example, the NF entities may communicate with the UE, the gNB, or other NF entities such as the AMF, the SMF, the UPF, the PCF, the TSN AF, and the like. The network interface 1510 may transmit and receive signals and/or message to and from various network entities and may be called a transceiver.

A controller 1520 may be implemented as at least one processor or/and a program for performing the operation of the NF entities. For example, the controller 1520 may perform the operation of the NF entities.

A memory 1530 may store programs required by the controller 1520 and various pieces of control information, and other information described in the disclosure. Other network entities may also store information required for the operation described above.

In addition to the above-described elements, the NF entities may further include various interfaces for access to an operator. In the disclosure, there is no special limitation on such additional elements.

Figure 16:
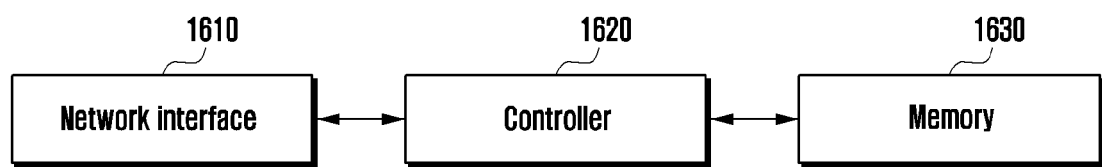
FIG. 16 illustrates a block diagram of TSN nodes according to an embodiment.

FIG. 16 illustrates a block diagram of TNS nodes according to an embodiment.

The TSN nodes may communicate with other network entities of the core network through a network interface 1610 and may be called a transceiver. For example, the TSN nodes may communicate with the UE, the gNB, or other NF entities such as the UPF, the AMF, the SMF, the PCF, the TSN AF, and the like.

A controller 1620 may be implemented as at least one processor and/or a program for performing the operation of the TSN nodes. For example, the controller 1620 may perform the operation of the TSN nodes described above.

A memory 1630 may store programs required by the controller 1620 and various pieces of control information, and other information described in the disclosure. Other network entities may also store information required for the operation described above.

In addition to the above-described elements, the TSN nodes may further include various interfaces for access to an operator. The TSN nodes may be normal network nodes. In the disclosure, there is no special limitation on such additional elements.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a first network function entity including a network side time sensitive network (TSN) translator (NW-TT) in a $5^{th}$ generation system (5GS), the method comprising:
   receiving, from a second network function entity, time synchronization information including first information indicating that the NW-TT and a device side TSN translator (DS-TT) supporting a same domain are synchronization sources of the 5GS, and second information indicating a format for a distribution of a time synchronization;
   generating a sync message for the DS-TT based on the time synchronization information;
   adding, to the sync message, an ingress timestamp corresponding to an ingress time at which the sync message is generated; and
   transmitting, to a terminal including the DS-TT, the sync message,
   wherein the sync message includes a rate ratio with a value set to 1.

2. The method of claim 1, wherein the rate ratio is used to convert a residence time associated with the ingress timestamp.

3. The method of claim 1, wherein the sync message is transmitted from the terminal to an external precision time protocol (PTP) port outside the 5GS.

4. A method performed by a terminal including a device side time sensitive network (TSN) translator (DS-TT) in a $5^{th}$ generation system (5GS), the method comprising:
   receiving, from a first network function entity including a network side TSN translator (NW-TT), a sync message including an ingress timestamp corresponding to an ingress time at which the sync message is generated;
   calculating a residence time based on a difference between an egress time and the ingress time indicated by the ingress timestamp;
   adding, the residence time to the sync message; and
   transmitting, to an external precision time protocol (PTP) port outside the 5GS, the sync message,
   wherein the sync message includes a rate ratio with a value set to 1.

5. The method of claim 4, wherein the calculating the residence time is performed based on the rate ratio.

6. The method of claim 4, further comprising:
   removing the ingress timestamp from the sync message after the calculating the residence time.

7. The method of claim 4, further comprising:
receiving, from a second network function entity, time synchronization information including first information indicating that the NW-TT and the DS-TT supporting a same domain are synchronization sources of the 5GS, and second information indicating a format for distribution of a time synchronization.

8. A first network function entity including a network side time sensitive network (TSN) translator (NW-TT) in a $5^{th}$ generation system (5GS), the first network function entity comprising:
a transceiver configured to transmit and receive a signal; and
a controller coupled with the transceiver and configured to:
receive, from a second network function entity, time synchronization information including first information indicating that the NW-TT and a device side TSN translator (DS-TT) supporting a same domain are synchronization sources of the 5GS, and second information indicating a format for a distribution of a time synchronization,
generate a sync message for the DS-TT based on the time synchronization information,
add, to the sync message, an ingress timestamp corresponding to an ingress time at which the sync message is generated, and
transmit, to a terminal including the DS-TT, the sync message,
wherein the sync message includes a rate ratio with a value set to 1.

9. The first network function entity of claim 8, wherein the rate ratio is used to convert a residence time associated with the ingress timestamp.

10. The first network function entity of claim 8, wherein the sync message is transmitted from the terminal to an external precision time protocol (PTP) port outside the 5GS.

11. A terminal including a device side time sensitive network (TSN) translator (DS-TT) in a $5^{th}$ generation system (5GS), the terminal comprising:
a transceiver configured to transmit and receive a signal; and
a controller coupled with the transceiver and configured to:
receive from a first network function entity including a network side TSN translator (NW-TT) a sync message including an ingress timestamp corresponding to an ingress time at which the sync message is generated,
calculate a residence time based on a difference between an egress time and the ingress time indicated by the ingress timestamp,
add, the residence time to the sync message, and
transmit, to an external precision time protocol (PTP) port outside the 5GS, the sync message,
wherein the sync message includes a rate ratio with a value set to 1.

12. The terminal of claim 11, wherein the calculating the residence time is performed based on the rate ratio.

13. The terminal of claim 11, wherein the controller is further configured to:
remove the ingress timestamp from the sync message after the calculating the residence time.

14. The terminal of claim 11, wherein the controller is further configured to:
receive, from a second network function entity, time synchronization information including first information indicating that the NW-TT and the DS-TT supporting a same domain are synchronization sources of the 5GS, and second information indicating a format for distribution of a time synchronization.

* * * * *